US012640041B2

(12) United States Patent
Kim et al.

(10) Patent No.: US 12,640,041 B2
(45) Date of Patent: May 26, 2026

(54) URBAN AIR TRAFFIC MANAGEMENT SERVICE APPARATUS, URBAN AIR TRAFFIC MANAGEMENT CONTROL PROCESSING METHOD, AND STORAGE MEDIUM STORING INSTRUCTION TO PERFORM METHOD URBAN AIR TRAFFIC MANAGEMENT CONTROL PROCESSING METHOD

(71) Applicant: SK TELECOM CO., LTD., Seoul (KR)

(72) Inventors: Jeongseok Kim, Seoul (KR); Soonki Jo, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 231 days.

(21) Appl. No.: 18/653,147

(22) Filed: May 2, 2024

(65) Prior Publication Data
US 2024/0371274 A1 Nov. 7, 2024

(30) Foreign Application Priority Data

| | | |
|---|---|---|
| May 3, 2023 | (KR) | 10-2023-0057896 |
| May 25, 2023 | (KR) | 10-2023-0067337 |
| Oct. 27, 2023 | (KR) | 10-2023-0145371 |
| Oct. 27, 2023 | (KR) | 10-2023-0145431 |

(51) Int. Cl.
*G05G 5/00* (2006.01)
*G08G 5/22* (2025.01)
*H04L 67/12* (2022.01)

(52) U.S. Cl.
CPC ............... *G08G 5/22* (2025.01); *H04L 67/12* (2013.01)

(58) Field of Classification Search
CPC ............ G08G 5/00; G08G 5/22; H04L 67/12
USPC .......................................................... 701/120
See application file for complete search history.

(56) References Cited

U.S. PATENT DOCUMENTS

| | | | | |
|---|---|---|---|---|
| 9,979,789 | B2 * | 5/2018 | Lu | H04L 67/12 |
| 12,067,889 | B2 * | 8/2024 | Panchangam | G08G 5/727 |
| 12,420,814 | B2 * | 9/2025 | Rao | H04L 67/12 |
| 2022/0309932 | A1 * | 9/2022 | Pokorny | G05D 1/0011 |

\* cited by examiner

*Primary Examiner* — Andrew Joseph Rudy
(74) *Attorney, Agent, or Firm* — Hauptman Ham, LLP

(57) ABSTRACT

There is provided a UATM service apparatus included in a plurality of UATM service apparatuses for implementing a multiplex UATM network. The apparatus comprises a UATM network connector configured to share control data with other UATM network connectors connected to the multiplex UATM network based on a pre-determined authority; and a UATM service provider configured to perform control processing on at least one of a plurality of control objects or control areas separated from all control objects or control areas for the multiplex UATM network according to a pre-determined logical operation criterion or a pre-determined physical space criterion, and collect the control data by a pre-determined criterion or modify the control data by a pre-determined criterion to share the collected control data or the modified control data with other UATM service apparatuses through the UATM network connector and the other UATM network connectors.

20 Claims, 14 Drawing Sheets

100

120

AIR TRAFFIC CONTROL PROCESSING APPARATUS #2

110

AIR TRAFFIC CONTROL PROCESSING APPARATUS #1

130

AIR TRAFFIC CONTROL PROCESSING APPARATUS #3

URBAN AIR TRAFFIC MANAGEMENT SERVICE APPARATUS, URBAN AIR TRAFFIC MANAGEMENT CONTROL PROCESSING METHOD, AND STORAGE MEDIUM STORING INSTRUCTION TO PERFORM METHOD URBAN AIR TRAFFIC MANAGEMENT CONTROL PROCESSING METHOD

CROSS-REFERENCE TO RELATED APPLICATION

This application claims priority to Korean Patent Application No. 1) 10-2023-0057896 field on May 3, 2023, Korean Patent Application No. 2) 10-2023-0067337 filed on May 25, 2023, Korean Patent Application No. 3) 10-2023-0145371 filed on Oct. 27, 2023, and Korean Patent Application No. 4) 10-2023-0145431 filed on Oct. 27, 2023. All of the aforementioned applications are hereby incorporated by reference in their entireties.

TECHNICAL FIELD

The present disclosure relates to an urban air traffic management (UATM) service apparatus for a multiplex UATM network and a control processing method for the same.

BACKGROUND

Recently, urban air mobility (hereinafter, "UAM") has been receiving greater attention, especially in developed nations, and South Korea also conducted a comprehensive empirical study on Korean UAM, which is going to be commercially available soon. UAM refers to an air transport ecosystem that includes a means of transportation such as an eVTOL (electronic vertical take-off and landing) aircraft which carry people or cargo through the air in urban and suburban areas and an infrastructure, a platform service, etc. for supporting such a means of transportation.

Although UAM may use part of existing air traffic control areas, it is expected to operate at relatively slow speeds and high densities, at lower altitudes than high-altitude aircrafts. Moreover, UAM requires more complex and sophisticated technologies than existing air traffic control, since regional climatic conditions affected by high-rise buildings and topography, restrictions around residential areas, and so on should be taken into consideration. In addition, UAM aims to provide high-density operation, use a dynamic route, and provide advanced autonomous flights under various situations, and another main characteristic is its operation in cooperation with other means of transportation.

Owing to these characteristics, UAM will be operated on a regional scale as opposed to existing aircraft, and it will be necessary to manage UAM air vehicles for various points on UAM routes and various purposes. Consequently, in order for a single urban air traffic management service provider (UATM SP) to perform integrated control, the issue of data congesttion needs to be dealt with, and this increases the need to consider a multiplex control system in which a plurality of UATM service providers manages separately.

SUMMARY

According to an embodiment, there is provided an UATM service apparatus for a multiplex UATM (multiplex urban air traffic management) network and a control processing method for the same, which are capable of supporting a reliable data exchange system among UATM service providers and resolving data congestion through distributed management.

The aspects of the present disclosure are not limited to the foregoing, and other aspects not mentioned herein will be able to be clearly understood by those skilled in the art from the following description.

In accordance with a first aspect of the present disclosure, there is provided an urban air traffic management (UATM) service apparatus included in a plurality of UATM service apparatuses for implementing a multiplex UATM network, the UATM service apparatus comprises: a UATM network connector configured to share control data with other UATM network connectors connected to the multiplex UATM network based on a pre-determined authority: and a UATM service provider configured to perform control processing on at least one of a plurality of control objects or control areas separated from all control objects or control areas for the multiplex UATM network according to a pre-determined logical operation criterion or a pre-determined physical space criterion, and collect the control data by a pre-determined criterion or modify the control data by a pre-determined criterion to share the collected control data or the modified control data with other UATM service apparatuses through the UATM network connector and the other UATM network connectors.

Herein, the UATM service provider may be configured to perform reliability-based information exchange with a supplemental data service provider (SDSP) within the same control range which is defined according to the pre-determined physical space criterion or the pre-determined logical operation criterion, and perform information exchange with a supplemental data service provider within a different control range based on authority given by other UATM service provider within the different control range.

Additionally, the UATM network connector may be configured to manages authentication or authorization for participation in the multiplex UATM network on behalf of the UATM service apparatus.

The UATM service provider may be configured to grant the UATM network connector the authority to manage authentication or authorization for participation in the multiplex UATM network.

The UATM service provider or the UATM network connector may be configured to assign a unique UATM service identifier to the UATM service apparatus thereof to exchange data with the other UATM network connectors.

Additionally, the UATM network connector may be connected to the other UATM service apparatuses included in the multiplex UATM network, and the UATM service provider may be configured to transmit and receive the control data by mirroring the other UATM service apparatuses through the UATM network connector or relays the control data to other UATM service apparatuses to synchronize the control data.

The UATM network connector may be connected to transmit to the other UATM service apparatuses information on a UATM service provider storing control data to be synchronized in order to relay the control data.

Different data exchange rules may be applied depending on whether a control object or a control area controlled by the UATM service apparatus and a control object or a control area controlled by the other UATM service apparatus are the same or different.

If a control object or a control area controlled by the UATM service apparatus and a control object or a control area controlled by the other UATM service apparatus are the same, the UATM service provider included in the control object or the control area may directly request other UATM service provider included in the control object or the control area.

If a control object or a control area controlled by the UATM service apparatus and a control object or a control area controlled by the other UATM service apparatus overlap at least partially, the UATM service provider of the other UATM service apparatus may act as a proxy for data transmission upon a request for information on the UATM service provider of the UATM service apparatus, or provide information indicating that it is able to receive data from the UATM service provider of the UATM service apparatus.

In accordance with a second aspect of the present disclosure, there is provided an urban air traffic management (UATM) control processing method performed by a UATM service apparatus included in a plurality of UATM service apparatuses for implementing a multiplex UATM network, the method comprises receiving, by a UATM service provider performing control processing, a unique identifier assigned by a UATM network connector connected to the multiple UATM network according to a data exchange system based on a preset protocol: setting, by the UATM service provider, a control object or control area thereof according to a pre-determined logical operation criterion or a pre-determined physical space criterion, among all control objects or control areas for the multiple UATM network; and declaring, by the UATM service provider, the set control object or the set control area thereof using the unique identifier through the UATM network connector.

In accordance with a second aspect of the present disclosure, there is provided a non-transitory computer readable storage medium storing computer executable instructions, wherein the instructions, when executed by a processor, cause the processor to perform an urban air traffic management (UATM) control processing method performed by a UATM service apparatus included in a plurality of UATM service apparatuses for implementing a multiplex UATM network.

According to an embodiment, there is provided a multiplex UATM system which supports a reliable data exchange system among UATM service providers and resolves data congestion through distributed management.

Furthermore, according to an embodiment, a UATM service apparatus involved in an air traffic control network performs control processing on at least one of a plurality of control objects or control areas that are separated according to a logical operation criterion or a physical space criterion, with respect to all air traffic control objects or all air traffic control areas, and collects or processes control data and shares it with other UATM service apparatuses involved.

Furthermore, according to an embodiment, it is possible to manage the authentication and authorization of a UATM service apparatus wanting to participate in a multiplex UATM network and to assign a unique UATM service identifier for data exchange with other UATM service apparatuses.

Accordingly, smooth air traffic control can be achieved even when there is a plurality of air vehicles flying along the same air corridor or a similar air corridor in a multiplex UATM network environment, or even when a plurality of UATM service apparatuses coexists.

BRIEF DESCRIPTION OF THE DRAWINGS

FIG. 1 is a configuration diagram of an air traffic control system capable of employing a UATM service apparatus as an air traffic control processing apparatus, according to an embodiment of the present disclosure.

Figure 2:
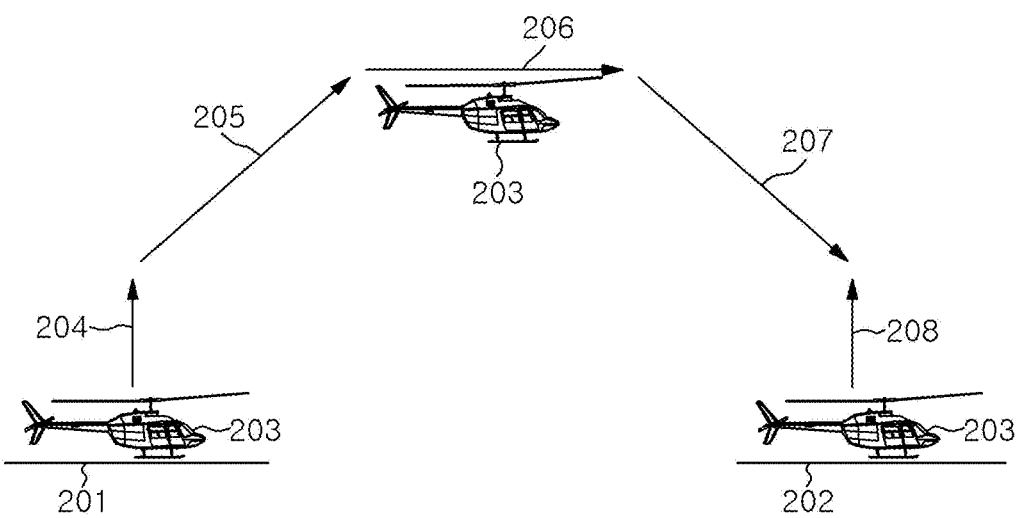

FIG. 2 is an illustrative drawing of a corridor for a UAM air vehicle to which an air traffic control processing method according to an embodiment of the present disclosure is applicable.

FIGS. 3 to 6 are views showing various examples of traffic control for different air control ranges that can be implemented by applying a UATM control processing method according to an embodiment of the present disclosure.

Figure 7:
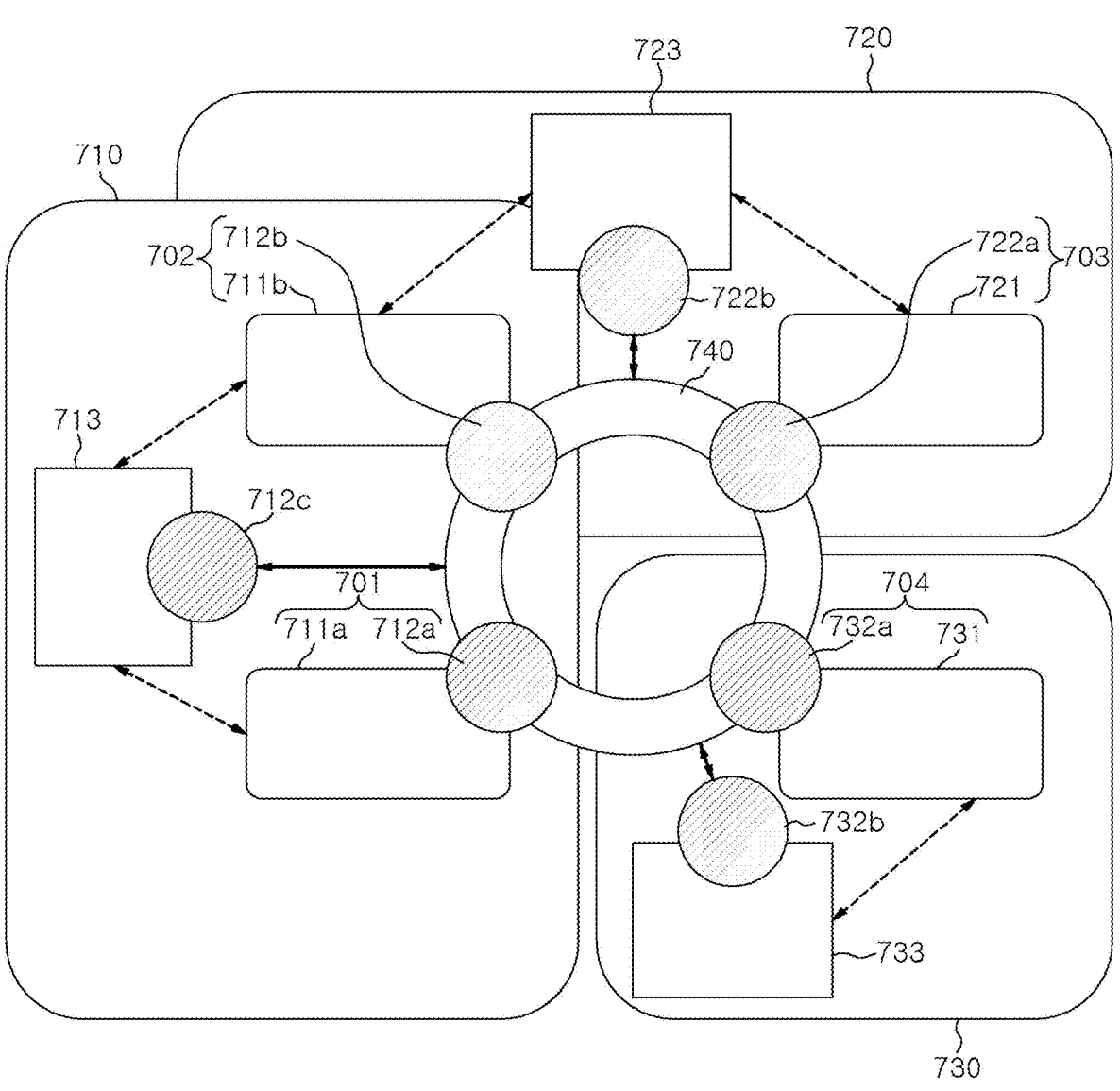

FIG. 7 is an illustrative drawing of an air traffic control system for three control ranges defined according to an air traffic control processing method according to an embodiment of the present disclosure.

Figure 8:
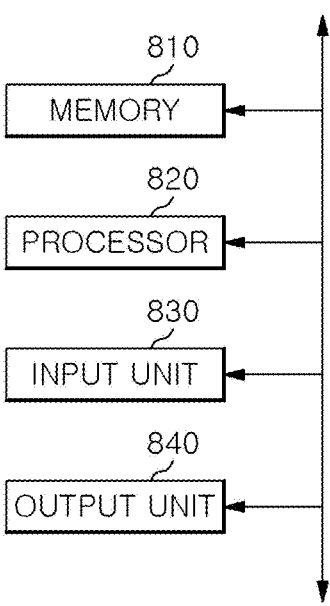

FIG. 8 is a configuration diagram of a UATM service provider 711a, 711b, 721, and 731 constituting the air traffic control system exemplified in FIG. 7.

Figure 9:
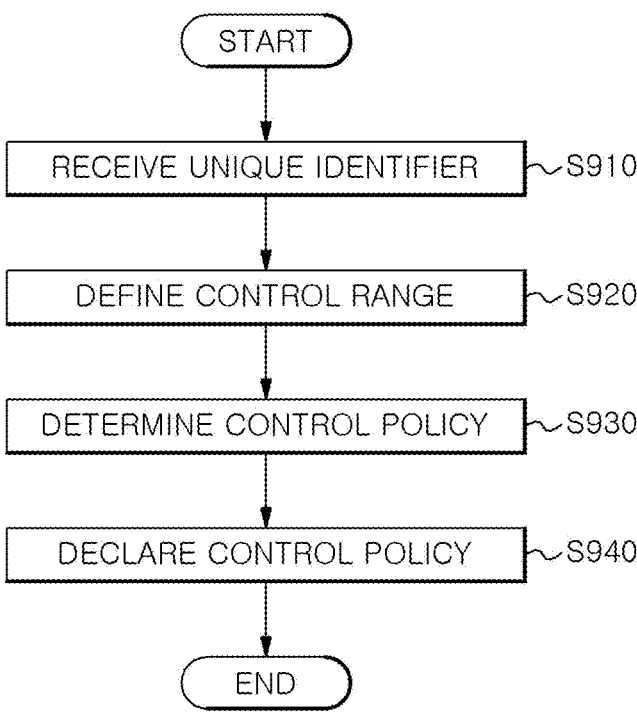
Figure 10:
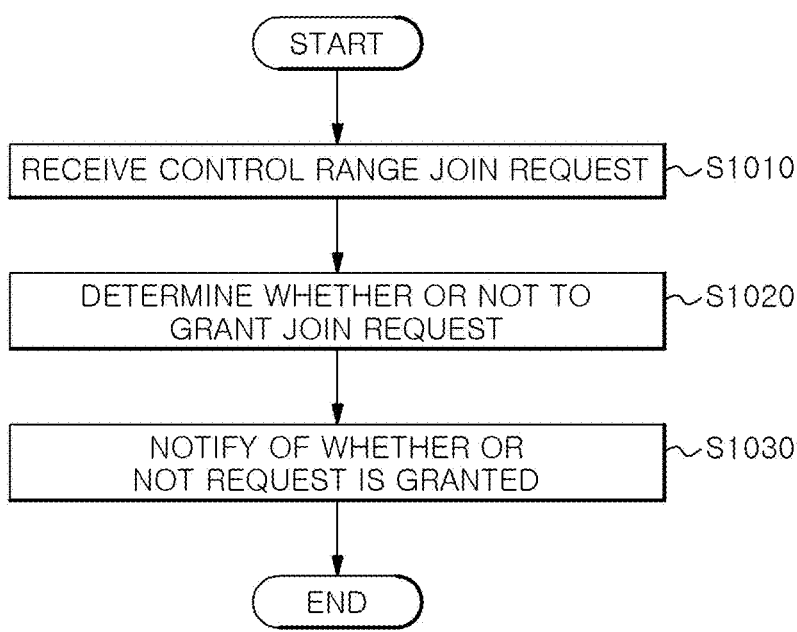

FIGS. 9 and 10 are flowcharts illustrating a UATM control processing method performed by the UATM service provider 711a, 711b, 721, and 731.

Figure 11:
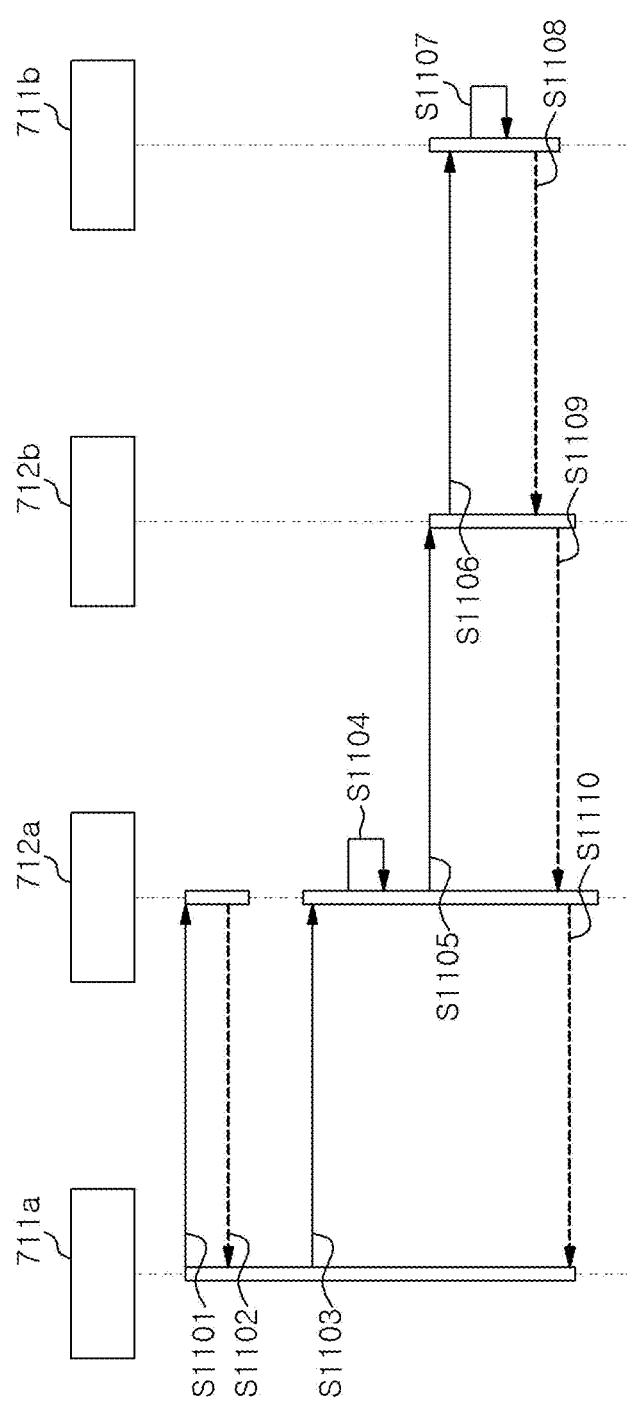
Figure 12:
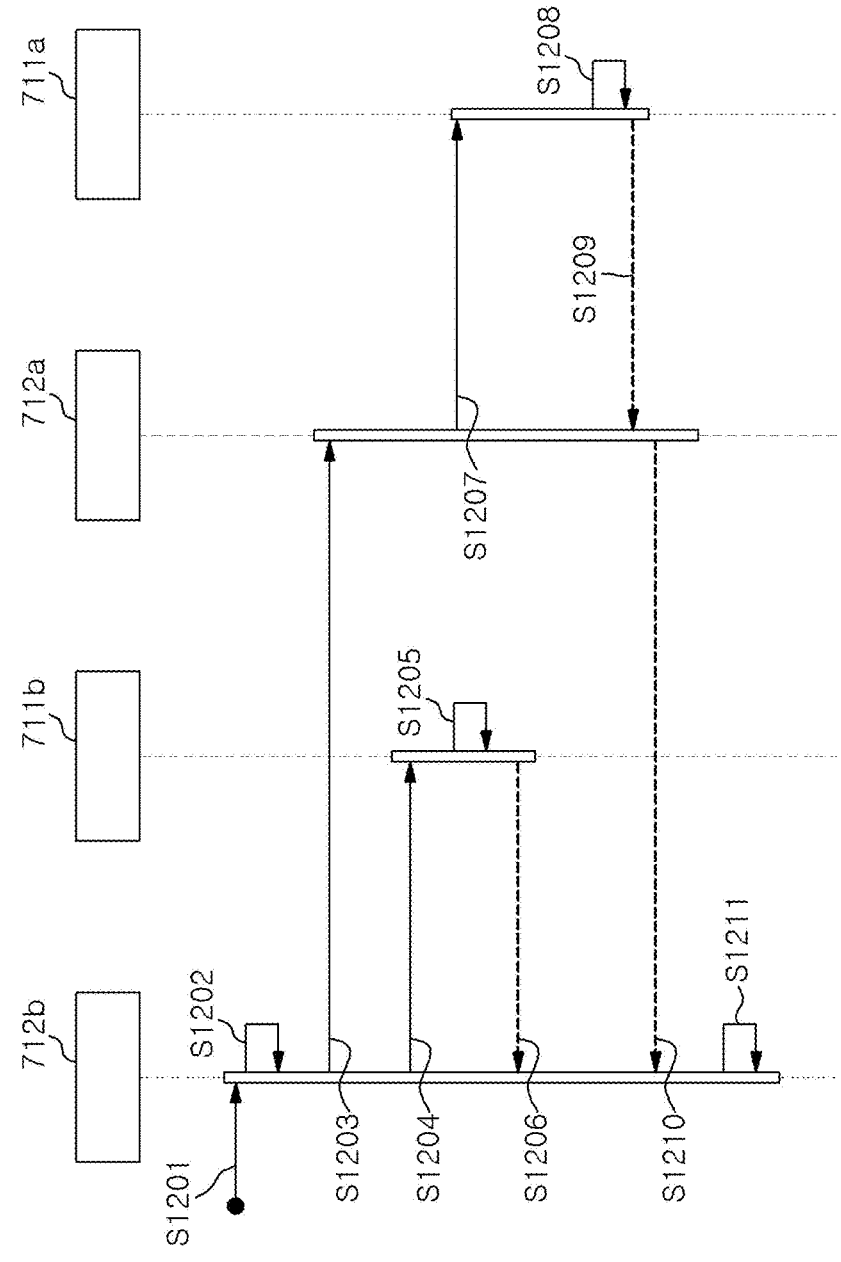

FIGS. 11 and 12 are signal flowcharts illustrating examples in which a plurality of UATM service apparatuses participates in air traffic control for a single control range in a multiple UATM control system according to an embodiment of the present disclosure.

Figure 13:
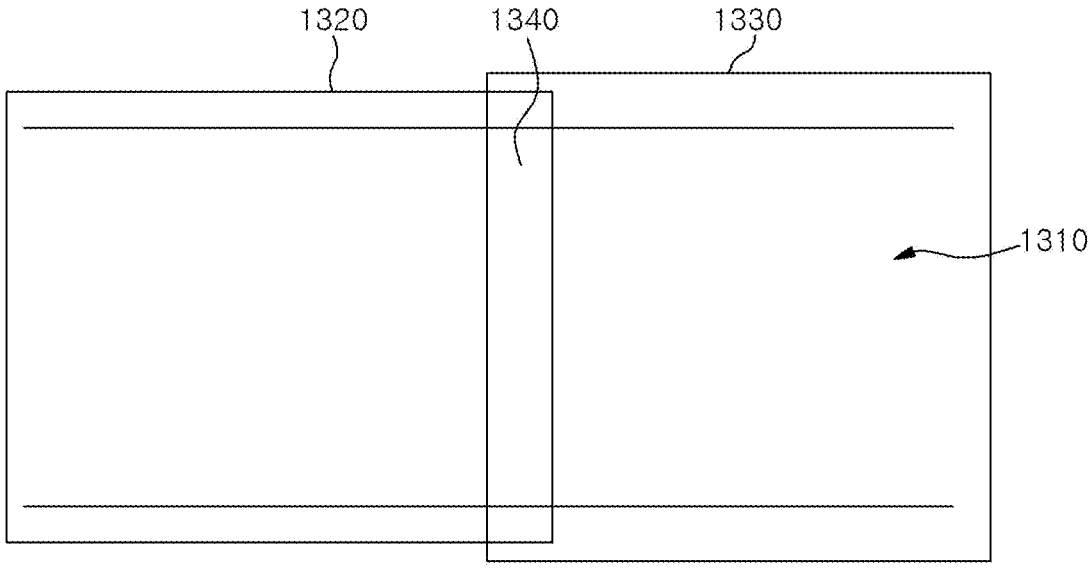
Figure 14:
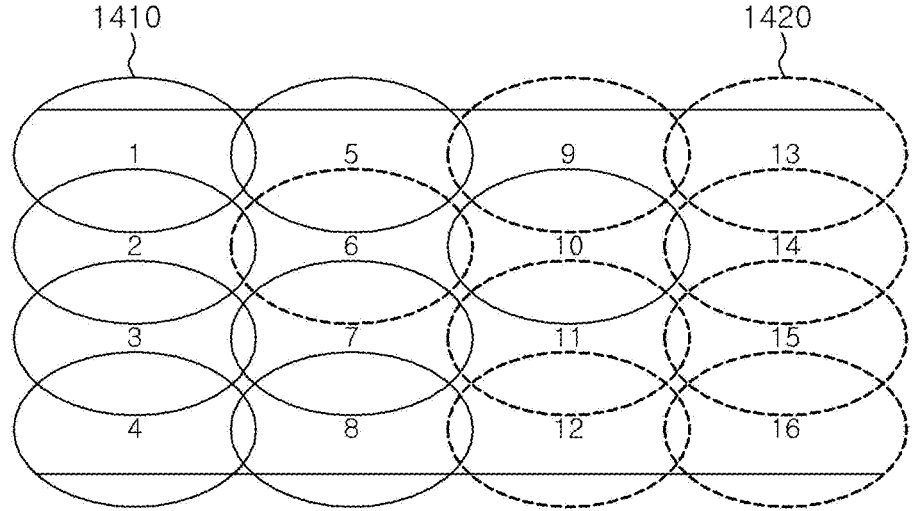

FIGS. 13 and 14 are conceptual diagrams illustrating examples of information included in an air traffic control policy that can be declared by an air traffic control processing method according to an embodiment of the present disclosure.

Figure 15:
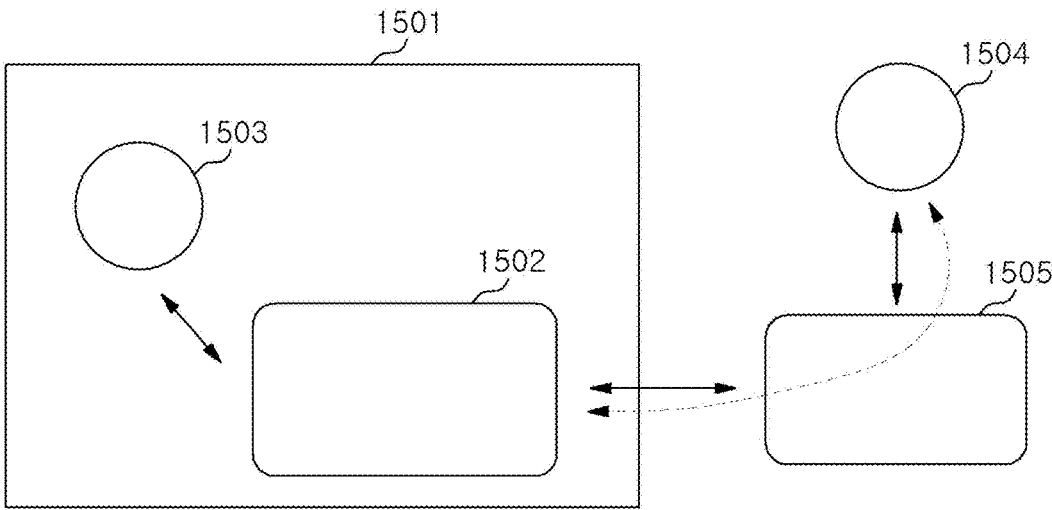
Figure 16:
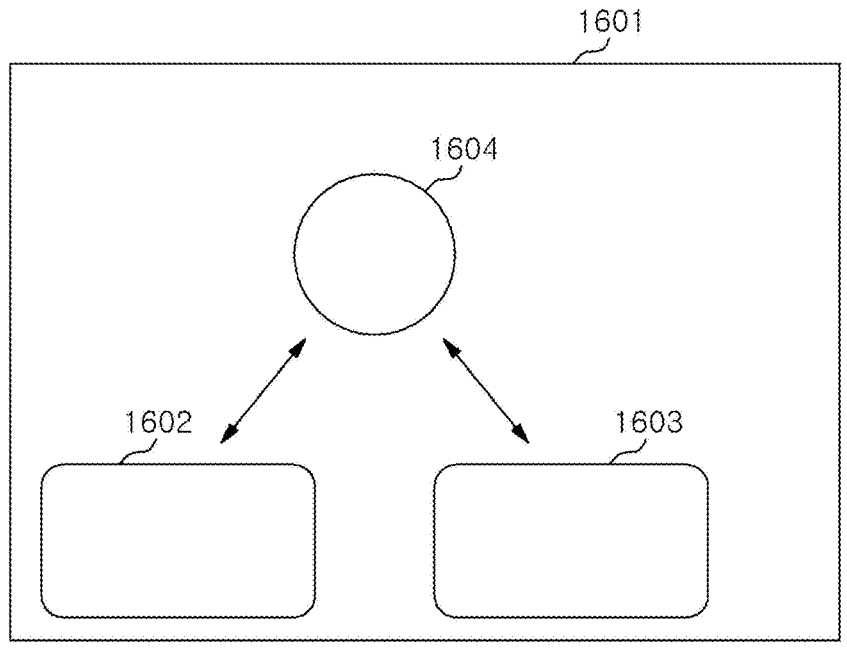
Figure 17:
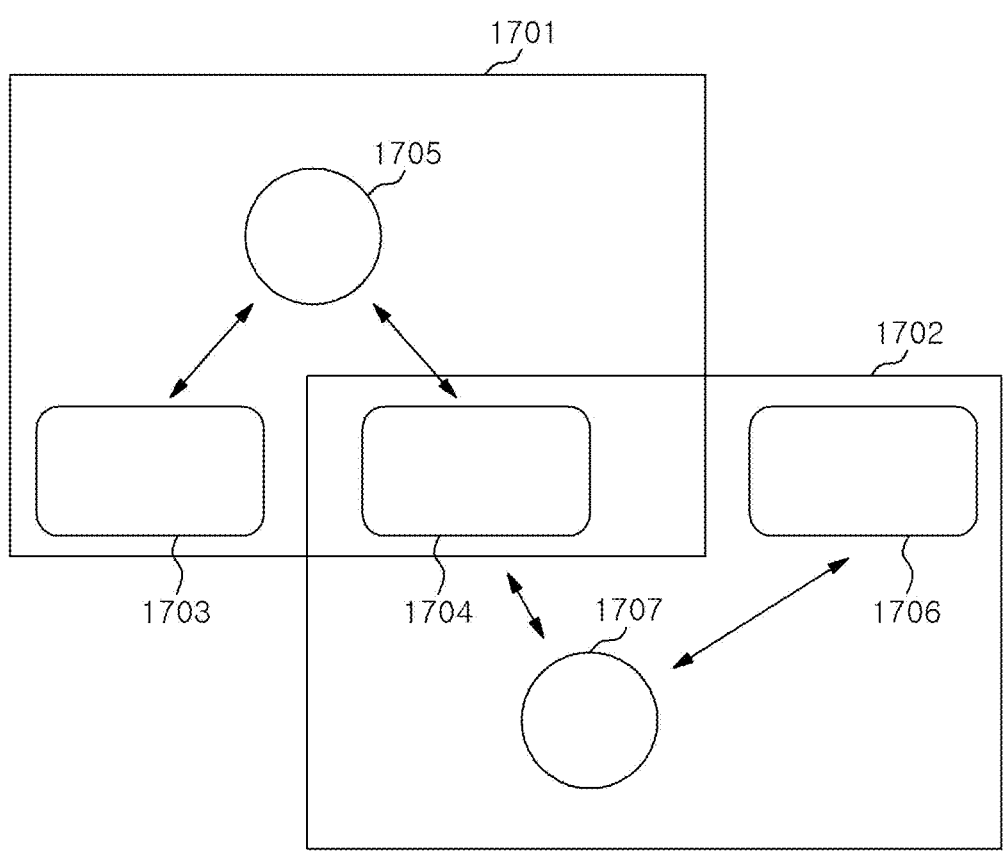

FIGS. 15 to 17 are conceptual diagrams illustrating various examples of a control range that can be configured by an air traffic control processing method according to an embodiment of the present disclosure.

Figure 18:
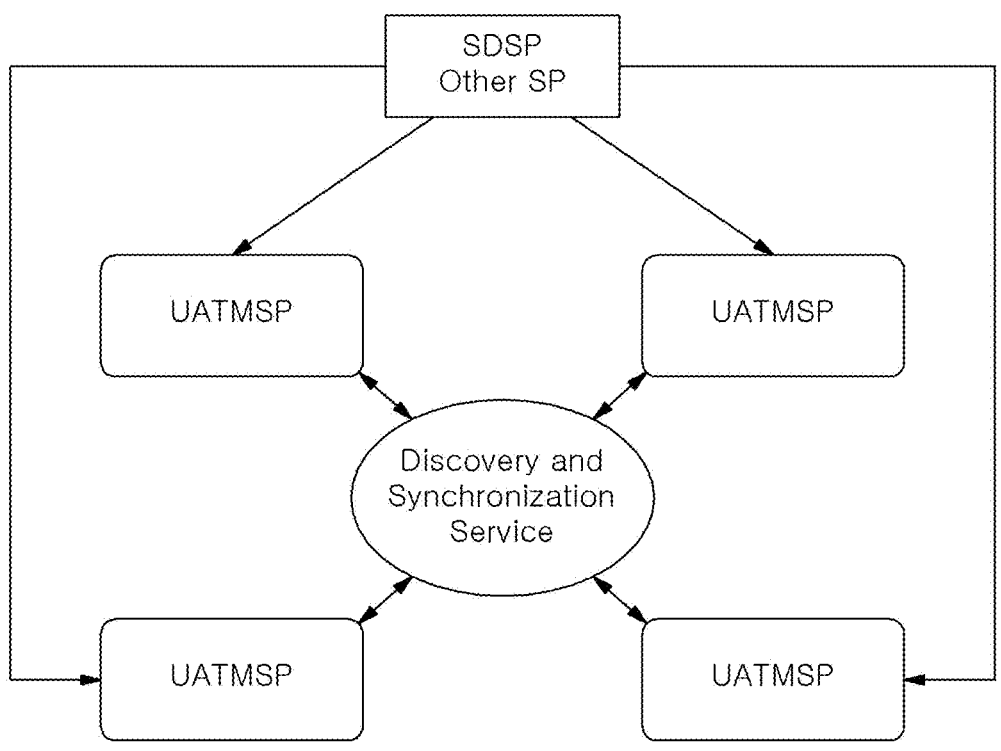

FIG. 18 is a configuration diagram of a multiplex control system when a DSS data exchange protocol is applied between UATM service providers.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

In order to provide a reliable data exchange system among UATM service providers constituting a multiplex control system, the application of a Discovery and Synchronization service (DSS) data exchange protocol defined in the ASTM F3548-21 Standard Specification can be considered.

Figure 1:
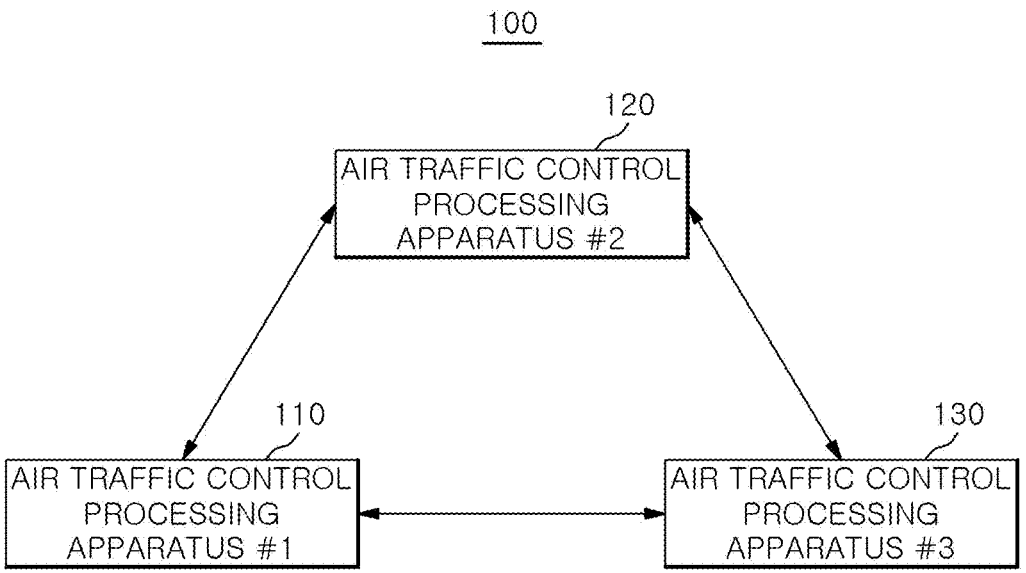

FIG. 1 is a configuration diagram of an air traffic control system capable of employing a UATM service apparatus as an air traffic control processing apparatus, according to an embodiment of the present disclosure.

Referring to FIG. 1, the air traffic control system 100 may include a plurality of air traffic control processing apparatuses 110, 120, and 130. As exemplified in FIG. 1, when there is a plurality of air traffic control processing apparatuses 110, 120, and 130, the may be connected to one another over a communication channel and involved in an air traffic control network. For example, the air traffic control processing apparatus 110 may perform control processing on at least one of a plurality of control objects or control areas that are separated according to a logical operation criterion or a physical space criterion, with respect to all air traffic control objects or areas for a multiplex UATM network, and may collect or process control data according to a predetermined criterion and share it with the other air traffic control processing apparatuses 120 and 130. Also, the air traffic control processing apparatus 110 may identify a control range including at least some of the air traffic control objects or at least some of the air traffic control areas, based on corridor information included in a flight plan of a UAM air vehicle, determine an air traffic control policy to apply to objects or areas within the identified control range that are subject to control, and declare the determined air traffic control policy in order for the other air traffic control processing apparatuses 120 and 130 to check for it. Although FIG. 1 illustrates three air traffic control processing apparatuses 110, 120, and 130 by way of example, the number of air traffic control processing apparatuses 110, 120, and 130 constituting the air traffic control system 100 is not specifically limited.

In the air traffic control system 100, a UAM air vehicle may fly a given route according to a pre-submitted flight plan. The flight plane may include a flight trajectory from a point of departure to a destination, and may include information on the expected time of arrival at each point which may be represented as a 4DT (4-dimensional trajectory). The air traffic control processing apparatuses 110, 120, and 130 may determine an aircraft's delay state, off-course state, etc. depending on pre-submitted 4DT information and temporal and spatial inconsistency, and may adjust the flight schedule or give an appropriate instruction to the pilot in command (PIC) depending on the situation. That is, all information generated on route may be known to the air traffic control processing apparatuses 110, 120, and 130.

FIG. 2 is an illustrative drawing of a corridor for a UAM air vehicle to which an air traffic control processing method according to an embodiment of the present disclosure is applicable. As shown in the drawing, a UAM air vehicle 203 may depart from a departure vertiport 201 and fly along a corridor to a destination vertiport 202 via a vertical ascending zone 203, an angled ascending zone 205, a flight altitude zone 206, an angled descending zone 207, and a vertical descending zone 208.

In the following description, an air traffic control network for a UAM air vehicle 203 that is flying along the corridor illustrated in FIG. 2 will be taken as an example. Moreover, a description will be given of the operation of the air traffic control processing apparatus 110 that may constitute the air traffic control system 100 from the perspective of the air traffic control processing apparatus 100, and the same operation may be performed by the other air traffic control processing apparatuses 120 and 130.

In the air traffic control processing apparatus 110, a computer program including at least one instruction is stored in a memory, in order for a processor to perform various processes for an air traffic control processing method according to an embodiment of the present disclosure, and the processor of the air traffic control processing apparatus 110 may perform various functions of the air traffic control processing apparatus 110 and/or various processes for the air traffic control processing method according to an embodiment of the present disclosure, by loading the computer program from the memory and executing the instruction included in it.

The air traffic control processing apparatus 110 may define a control range for at least some of air traffic control objects or at least some of air traffic control areas, based on a flight plan of a UAM air vehicle. The air traffic control processing apparatus 110 may identify the above-mentioned control range or a control range predefined by itself or another air traffic control processing apparatus and determine an air traffic control policy to apply to an object subject to control within the identified control range. For example, the air traffic control policy may include information on an object or area subject to air traffic control and an air traffic control data sharing system. For instance, the air traffic control data sharing system may include a data management scheme with other air traffic control processing apparatuses. Also, the air traffic control processing apparatus 110 declares the determined air traffic control policy in order for the other air traffic control processing apparatuses 120 and 130 involved in the air traffic control network to check for it.

Figure 3:
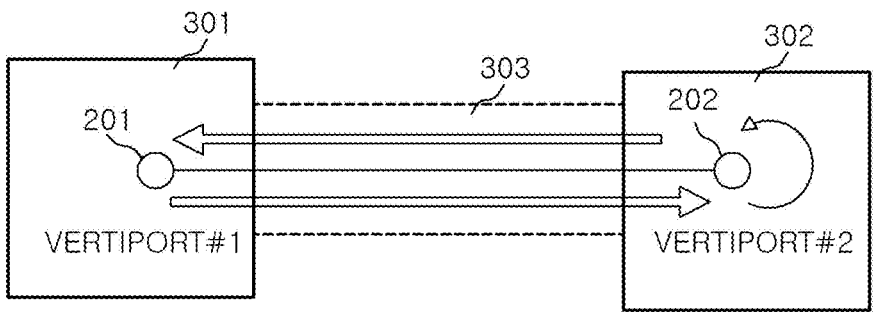
Figure 4:
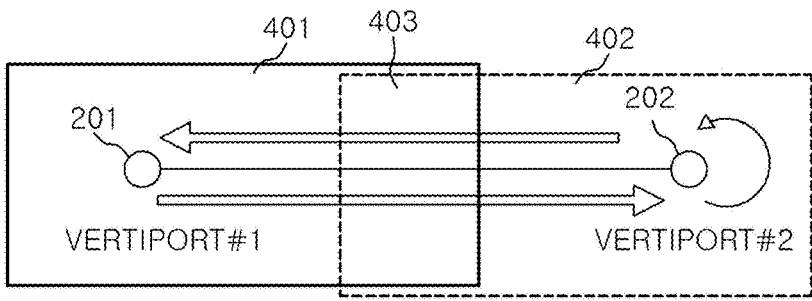
Figure 5:
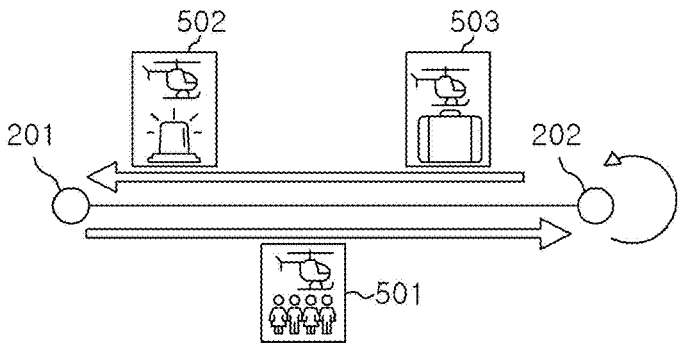
Figure 6:
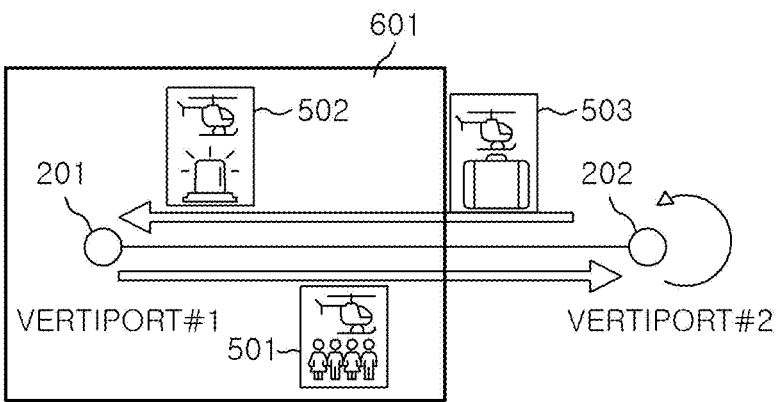

The air traffic control processing apparatus 110 may define a control range for determining an air traffic control policy by using any one of various examples, as illustrated in FIGS. 3 to 6. FIGS. 3 and 4 show an example of defining a control range for determining an air traffic control policy according to a physical space criterion, FIG. 5 shows an example of defining a control range for determining an air traffic control policy according to a logical operation criterion, and FIG. 6 shows an example of defining a control range for determining an air traffic control policy according to a combination of a physical space criterion and a logical operation criterion.

Referring to FIG. 3, the air traffic control processing apparatus 110 may determine an air traffic control policy for one or more selected from among a first control range 301 including at least part of the area of the departure vertiport 201 of the UAM air vehicle 203, a second control range 302 including at least part of the area of the destination vertiport 202 of the UAM air vehicle 203, and a third control range 303 including at least part of the flight altitude zone 206 of the UAM air vehicle 203. For example, the air traffic control processing apparatus 110 may determine an air traffic control policy for the first control range 301, the air traffic control processing apparatus 120 may determine an air traffic control policy for the second control range 302, and the air traffic control processing apparatus 130 may determine an air traffic control policy for the third control range 303. For example, the first control range 301, the second control range 302, and the third control range 303 may be operated by the same company or different companies, or may be operated partly by the same company. This may apply equally to control ranges according to embodiments that will be described below with reference to FIGS. 4 to 6.

Referring to FIG. 4, the air traffic control processing apparatus 110 may determine an air traffic control policy for a fourth control range 401 including at least part of the area of the departure vertiport 201 of the UAM air vehicle 203 and at least part of the flight altitude zone 206. Also, the air traffic control processing apparatus 110 may determine an air traffic control policy for a fifth control range 501 including at least part of the area of the destination vertiport 202 of the UAM air vehicle 203 and at least part of the flight altitude zone 206. FIG. 4 shows that there may be an overlapping portion 403 between the fourth control range 401 and the fifth control range 402. Here, the air traffic control processing apparatus 110 may determine an air traffic control policy for both of the fourth control range 401 and the fifth control range 402. Alternatively, the air traffic control processing apparatus 110 may determine an air traffic control policy for the fifth control range 401, and the other air traffic control processing apparatuses 120 and 130 may determine an air traffic control policy for the fifth control range 402.

Referring to FIG. 5, the air traffic control processing apparatus 110 may determine and declare an air traffic control policy for at least some selected from among air traffic control objects based on a flight plan of a UAM air vehicle. For example, the air traffic control processing apparatus 110 may determine and declare an air traffic control policy for one or more selected from among a sixth control range 501 incorporating a passenger transport feature, a seventh control range 502 incorporating an emergency transport feature, or an eighth control range 503 incorporating a cargo transport feature, which are air traffic control objects. Here, the sixth control range 601, the seventh control range 502, and the eighth control range 503 may be operated by one of the air traffic control processing apparatuses 110, 120, and 130, or may be operated by different air traffic processing apparatuses, respectively, or may be operated partly by the same air traffic control processing apparatus. For example, in a case where the sixth control range 501, the seventh control range 502, and the eighth control range 503 are operated collaboratively by two or more of a plurality of air traffic control processing apparatuses 110, 120, and 130 located in the same space or in adjacent places, the two or more air traffic control processing apparatuses may share control data they collect with one another and measure the capacity of an air corridor, etc. based on shared control data.

FIG. 6 shows an example of combined application of control ranges defined according to a physical space criterion explained with reference to FIG. 3 and FIG. 4 and control ranges defined according to a logical operation criterion explained with reference to FIG. 5. For example, in a case where the sixth control range 501 incorporating a passenger transport feature, the seventh control range 502 incorporating an emergency transport feature, and the eighth control range 503 incorporating a cargo transport feature are defined, at least one of the plurality of air traffic control processing apparatuses 110, 120, and 130 that is in a favorable condition for collecting control data for a particular area defined according to a physical space criterion may define a ninth control range 601 and determine and declare an air traffic control policy for the ninth control range 601. In this case, the air traffic control processing apparatus operating the sixth control range 501, the air traffic control processing apparatus operating the seventh control range 502, and the air traffic control processing apparatus operating the ninth control range 601 may share control data with one another.

FIG. 7 is an illustrative drawing of an air traffic control system for three control ranges defined according to an air traffic control processing method according to an embodiment of the present disclosure. Here, the three control ranges are only for illustration and not limited thereby. In the following description, in order to help understanding of the explanation, an air traffic control processing apparatus that provides a control service for UAM will be referred to as a UATM service apparatus, and an environment in which a plurality of UATM service apparatuses are operated will be referred to as a multiplex UATM network.

As exemplified in FIG. 7, a first UATM service apparatus 701 and a second UATM service apparatus 702 may determine and declare an air traffic control policy for a tenth control range 710, a third UATM service apparatus 703 may determine and declare an air traffic control policy for an eleventh control range 720, and a fourth UATM service apparatus 704 may determine and declare an air traffic control policy for a twelfth control range 730. To this end, the UATM service apparatuses 701, 702, 703, and 704 may include UATM service providers 711a, 711b, 721, and 731 and UATM network connectors 712a, 712b, 722a, and 732a, respectively.

The UATM network connectors 712a, 712b, 722a, and 732a of the UATM service apparatuses 701, 702, 703, and 704 may share control data with other UATM network connectors connected to the multiple UATM network based on authority given by the UATM service providers 711a, 711b, 721, and 731. Also, the UATM network connectors 712a, 712b, 722a, and 732a may be given the authority to manage authentication and authorization for participation in the multiple UATM network on behalf of the UATM service apparatuses 701, 702, 703, and 704. To this end, the UATM network connectors 712a, 712b, 722a, and 732a may assign a unique UATM service identifier to their UATM service apparatuses 701, 702, 703, and 704 to exchange data with other UATM network connectors.

The UATM service providers 711a, 711b, 721, and 731 of the UATM service apparatuses 701, 702, 703, and 704 may perform control processing on at least one of a plurality of control objects or control areas that are separated according to a logical operation criterion or a physical space criterion, with respect to all air traffic control objects or areas for the multiplex UATM network, and may collect or process the control data according to a predetermined criterion and share it with other UATM service apparatuses through their UATM network connector and other UATM network connectors. Also, the UATM service providers 711a, 711b, 721, and 731 may give the UATM network connectors 712a, 712b, 722a, and 732a the authority to manage authentication or authorization for participation in the multiple UATM network. To this end, the UATM service providers 711a, 711b, 721, and 731 may assign a unique UATM service identifier to their UATM service apparatuses 701, 702, 703, and 704 to exchange data with other UATM network connectors.

One or more supplemental data service providers (SDSP) 713, 723, and 733 may be located in each of the tenth, eleventh, and twelfth control ranges 710, 720, and 730, and the supplemental data service providers 713, 723, and 733 may be allocated UATM network connectors 712c, 722b, and 732b, respectively, which assign a unique identifier according to a data exchange system. In this case, the UATM service providers 711a, 711b, 721, and 731 may perform reliability-based information exchange with a supplemental data service provider within the same control range which is defined according to the physical space criterion or the logical operation criterion, and may perform information exchange with a supplemental data service provider within a different control range based on authority given by other UATM service provider within the different control range.

For example, the UATM service provider 711a may perform reliability-based information exchange with the supplemental data service provider 713 within the same control range, i.e., the tenth control range 710, which is defined according to the physical space criterion or the logical operation criterion, and may perform information exchange with the supplemental service providers 723 and 733 within different control ranges 720 and 730 based on authority given by different UATM service providers 721 and 731 within the different control ranges 720 and 730.

Although not shown in FIG. 7, various apparatuses or servers (e.g., apparatuses that provide regulation information, existing air control system servers, etc.) that may be operated by a UAM stakeholder or the like may be included in each of the control ranges 710, 720, and 730, in which case network connectors may be allocated to these apparatuses or servers as well.

The eleventh control range 720 will be taken as a representative example in order to get into details about how the UATM service providers 711a, 711b, 721, and 731 and the UATM network connectors 712a, 712b, 722a, and 732a operate in the tenth control range 710, the eleventh control range 720, and the twelfth control range 730. The UATM network connector 722a within the eleventh control range 720 may assign a unique identifier to the UATM service provider 721 according to a data exchange system based on a preset protocol. Moreover, the UATM service provider 721 within the eleventh control range 720 may perform control processing on at least one of a plurality of control ranges that are separated according to a logical operation criterion or a physical space criterion, with respect to all air traffic control objects or areas for the multiplex UATM network, and may manage redundant data by mirroring the other UATM service apparatuses 701, 702, and 704 through the UATM network connector 722a or synchronize omitted data to some UATM service apparatuses through relay transmission. In addition, the UATM network connector 722a may propagate information on the UATM service provider 721 within the same control range in order to relay omitted data, if the UATM service provider 721 succeeds in storing data within the same control range.

Different data exchange rules are applied depending on whether a control range controlled by one of the UATM service apparatuses 701, 702, 703, and 704 and a control range controlled by another UATM service apparatus are the same or different.

For example, if a control range controlled by the UATM service apparatus 701 and a control range controlled by the UATM service apparatus 702 are the same, a certain UATM service provider 711a within the same control range may request the UATM service provider 711b within the same control range to send data.

For example, if a control range controlled by the UATM service apparatus 701 and a control range controlled by the UATM service apparatus 703 overlap at least partially, the UATM service provider 721 of the UATM service apparatus 703 may act as a proxy for data transmission upon a request for information on the UATM service provider 711b of the UATM service apparatus 702, or may provide information indicating that it is able to receive data from the UATM service provider 711b of the UATM service apparatus 702.

Meanwhile, the UATM network connectors 712a, 712b, 712c, 722a, 722b, 732a, and 732b may support various types of data transmission and reception between the first to fourth UATM service apparatuses 701, 702, 703, and 704 and the supplemental data service providers 713, 723, and 733, by forming a multiplex UATM network 740.

Data transmitted through the UATM network connectors 712a, 712b, 712c, 722a, 722b, 732a, and 732b may be encrypted and/or encoded to protect information and increase transmission efficiency, and encoded data may be propagated according to a P2P or network transmission protocol, thereby allowing all systems participating in the multiplex UATM network 740 to receive the encoded data in real time. An entity that processes and manages the encoded data may be a system capable of decoding. An entity that gives the authority to participate in the multiplex UATM network 740 may correspond to one or more of the first to fourth UATM service apparatuses 701, 702, 703, and 704.

In the eleventh control range 720, for example, the third UATM service apparatus 703 may determine whether to give authorization with respect to all services that want to participate in the multiplex UATM network 740. Also, in the twelfth control range 730, the fourth UATM service apparatus 704 may determine whether to give authorization with respect to all services that want to participate in the multiplex UATM. For example, the UATM service provider 721 of the third UATM service apparatus 703 may determine a UATM control policy for the eleventh control range 720, and may specify that it will be in charge of air traffic control by making a first declaration of the determined UATM control policy based on a unique identifier obtained from the UATM network connector 722a.

Moreover, in the tenth control range 710, the first UATM service apparatus 701 and the second UATM service apparatus 702 may determine in collaboration whether to give authorization with respect to all services that want to participate in the multiplex UATM network 740. For example, the UATM service provider 711a of the first UATM service apparatus 701 may determine a multiple UATM control policy for the tenth control range 710, and may specify that it will be in charge of air traffic control by making a first declaration of the determined multiple UATM control policy based on a unique identifier obtained from the UATM network connector 712a. Afterwards, the UATM service provider 711b of the second UATM service apparatus 702 may transmit a join request based on a unique identifier obtained from the UATM network connector 712b in order to collaborate in multiplex UATM control for the tenth control range 710. The UATM service provider 711a of the first UATM service apparatus 701 may grant the join request based on the unique identifier obtained from the UATM network connector 712a. In this case, the first UATM service apparatus 701 and the second UATM service apparatus 702 may be in charge of multiplex UATM control in collaboration.

Incidentally, if the first UATM service apparatus 701 and the second UATM service apparatus 702 collaborate in air traffic control, as in the tenth control range 710—that is, if there is an overlapping portion 403 between the fourth control range 401 and the fifth control range 402 as exemplified in FIG. 4, the relevant UATM service apparatuses may exchange and synchronize data. For example, when the second UATM service apparatus 702 makes a request to join in multiplex UATM control for the tenth control range 710 and the first UATM service apparatus 701 grants the join request, they may interactively exchange and synchronize collected data corresponding to the tenth control range 710.

Moreover, as an example of an overlapping portion between adjacent control ranges, the tenth control range 710 and the eleventh control range 720 may at least partially overlap as shown in FIG. 7, in which case the second UATM service apparatus 702 located in the overlapping portion may function to relay data collected by the first UATM service apparatus 701 and data collected by the third UATM service apparatus 703 in both directions. For example, the third UATM service apparatus 703 may request the second UATM service apparatus 702 for collaboration in air traffic control for the overlapping portion, the second UATM service apparatus 702 may forward the air traffic control collaboration request to the first UATM service apparatus 701, the first UATM service apparatus 701 may grant the air traffic control collaboration request, and the second UATM service apparatus 702 may relay the data collected by the first UATM service apparatus 701 and the data collected by the third UATM service apparatus 703 in both directions.

In addition, in the case that a control range is defined for an air traffic control object according to a logical operation criterion and an air traffic control policy is determined, as exemplified in FIGS. 5 and 6, data exchange and synchronization may be performed since different UATM service apparatuses may positionally overlap or be close to each other. For example, in the case of FIG. 5, a UATM service apparatus that determines a control policy for the sixth control range 501 incorporating a passenger transport feature, a UATM service apparatus that determines a control policy for the seventh control range 502 incorporating an emergency transport feature, and a UATM service apparatus that determines a control policy for the eighth control range 503 incorporating a cargo transport feature may interactively exchange and synchronize data. Further, a data collection feature may be delegated to a UATM service apparatus that is in a favorable environment (for instance, being located in the center, having an advantage in signal reception level, etc.) for collecting data for a particular space, among a plurality of UATM service apparatuses that positionally overlap or are close to each other, and this UATM service apparatus may share collected data with the other UATM service apparatuses.

In the air traffic control system exemplified in FIG. 7, the UATM network connectors 712a, 712b, 712c, 722a, 722b, 732a, and 732b may relay signal and/or message transmission and reception between the UATM service providers 711a, 711b, 721, and 731, as well as issuing unique identifiers for identifying the UATM service providers 711a, 711b, 721, and 731 in the multiplex UATM network 740. Moreover, when one of the UATM service providers 711a, 711b, 721, and 731 makes a request to join in air traffic control for a predefined control range, the corresponding UATM network connector may forward the join request to another UATM service apparatus and handle the authorization of the join request depending on whether or not the another UATM service apparatus grants the join request.

Meanwhile, the UATM network connectors 712a, 712b, 712c, 722a, 722b, 732a, and 732b shown in FIG. 7 may be implemented as a computer program or using hardware such as network equipment. For example, the UATM network connectors 712a, 712b, 712c, 722a, 722b, 732a, and 732b may be implemented as a software development kit (SDK).

FIG. 8 is a configuration diagram of a UATM service provider 711a, 711b, 721, and 731 constituting the air traffic control system exemplified in FIG. 7. FIGS. 9 and 10 are flowcharts illustrating a UATM control processing method performed by the UATM service provider 711a, 711b, 721, and 731.

Referring to FIG. 8, the UATM service provider 711a, 711b, 721, and 731 may include a memory 810 and a processor 820, and may further include an input unit 830 and/or an output unit 840.

The memory 810 can be implemented by a medium that stores information. Such a medium includes, but not limited to, ROM, RAM, etc. The memory 810 stores a computer program including at least one instruction for performing various processes for an air traffic control processing method according to an embodiment of the present disclosure. Also, the memory 810 may store in advance a flight plan including air corridor information of a UAM air vehicle, information on an air traffic control area and/or information on an air traffic control object, and various kinds of data such as numerous traffic regulations. Moreover, the memory 810 may store various processing results from the processor 820.

The processor 820 can be implemented by a processing apparatus having at least one core. For example, the processor 820 may be implemented to include at least one CPU or GPU. Such a processor 820 may read the aforementioned data or instructions stored in the memory 810 and write new data or instructions. Also, the processor 820 may modify or delete the data or instructions stored in the memory 810. Moreover, the UATM service apparatus may perform various functions by the processor 820, whereby a UATM control processing method according to an embodiment of the present disclosure may be performed. Hereinafter, the input unit 830 and the output unit 840 will be discussed, and then various functions the UATM service provider 711a, 711b, 721, and 731 may perform by the processor 820 will be discussed.

The input unit 830 may provide various data and instructions from the outside to the processor 820. For example, the input unit 830 may include a serial interface via which various data is inputted, a communication device that provides a communication channel, a user interface that provides a function for allowing for instruction input by the user, etc.

The output unit 840 may provide various data including processing results from the processor 820 to the outside. For example, the output unit 840 may include a serial interface via which various data is outputted, a communication device that provides a communication channel, a display for displaying various data on a screen, etc.

Referring further to FIG. 9, the processor 820 of the UATM service provider 711a, 711b, 721, and 731 may receive a unique identifier assigned by one of the UATM network connectors 712a, 712b, 712c, 722a, 722b, 732a, and 732b connected to the multiplex UATM network according to a data exchange system based on a preset protocol (S910), define a control range including at least some of all air traffic control objects or areas for an air traffic control network (S920), determine a control policy to apply to the defined control range (S930), and declare the above defined control range, i.e., a control object or a control area, using the unique identifier through the UATM network connector connected to it, in order for other UATM service apparatuses to check for it (S940). For example, the processor 820 may define a control range, determine an air traffic control policy, and declare the control range, based on a flight plan of a UAM air vehicle which is pre-stored in the memory 810 and inputted in advance or when necessary through the input unit 830.

Here, the air traffic control policy may include information on a control range, i.e., a control object or a control area, and a data management scheme between UATM service apparatuses within the same control range. For example, the information on a control object or a control area may include information on the coverage of the corresponding control range and information on the coverage of each UATM service apparatus within the control range. For example, if the control range includes at least some of all air traffic control areas that are separated according to a physical space criterion, the air traffic control policy may include, as information on the control range, information on air traffic control areas included in the control range and information on air traffic control areas to which the air traffic control policy is to be applied. The air traffic control areas included in the control range may include a plurality of unit spaces, and the information on air traffic control areas to which the air traffic control policy is to be applied may include information on at least some of the plurality of unit spaces. If the control range includes at least some of all air traffic control objects that are separated according to a logical operation criterion, the air traffic control policy may additionally include information on a newly defined object, among all air traffic control objects, as information on the control range. For example, the information on the coverage of the control range and the information on the coverage of each UATM service apparatus within the control range may be identically set, and at least one of passenger transport, cargo transport, and emergency transport may be identified as information on a control object.

Moreover, information on a data sharing system within the control range may include information on a system for sharing data by mirroring and a minimum storage space for storing data. In this case, a plurality of UATM service apparatuses may store the same data in the minimum storage space by mirroring. Also, the information on a data sharing system within the control range may include information on a system for relay transmission and sharing of omitted data. In this case, the omitted data may be relayed and synchronized between the plurality of UATM service apparatuses.

Referring further to FIG. 10, the processor 820 of the UATM service provider 711*a*, 711*b*, 721, and 731 may receive a join request from another UATM service provider or UATM network connector wanting to control a desired control object or area in a preset control range (S1010), determine whether or not to grant the request to join in the desired control object or area (S1020), and notify the another UATM service provider or UATM network connector of the determination as to whether or not the request is granted (S1030).

Meanwhile, upon a request to join in a control range, i.e., a control object or a control area, in which two or more of the plurality of UATM service apparatuses 701, 702, 703, and 704 are participating, the processor 820 may determine whether or not to grant the join request by negotiation with the other UATM service apparatus. Here, the join request may need to be transmitted to the two or more UATM service apparatuses for negotiation between the two or more UATM service apparatuses. In this case, the join request may be transmitted to the two or more UATM service apparatuses, and at the same time, the relevant UATM service providers or UATM network connectors may be notified of the determination as to whether or not the request is granted. That is, the transmission of the join request and the notification of the determination may be performed separately and simultaneously regardless of the results.

Moreover, the plurality of UATM service providers 711*a*, 711*b*, 721, and 731 may share or synchronize data with other UATM service providers in response to a determined air traffic control policy or a declared air traffic control policy. This may be part of the air traffic control data sharing system mentioned previously with reference to FIG. 1, but not limited thereto. For example, data may be shared or synchronized anytime, such as during or after determining an air traffic control policy or during or after declaring an air traffic control policy.

In addition, when checking for a control range for air traffic control, the plurality of UATM service providers 711*a*, 711*b*, 721, and 731 may check whether a predefined control range includes at least some of objects they will perform air traffic control on. If the predefined control range does not include at least some of objects they will perform air traffic control on, they may define a new control range. On the other hand, if the predefined control range includes at least some of the objects, they may participate in the predefined control range. For example, when participating in a predefined control range, the plurality of UATM service providers 711*a*, 711*b*, 721, and 731 may send a join request for the control range to another UATM service apparatus that predefined the control range or is participating in the control range, and then participate in the control range when the join request is granted.

FIG. 11 shows a process in which the UATM service apparatuses 701, 702, 703, and 704 participate in a predefined control range when at least some of objects or areas they will perform air traffic control on are already included in the predefined control range. A process in which the first UATM service apparatus 701 participates in a control range predefined by the second UATM service apparatus 702 will be described as an example.

The UATM service provider 711*a* of the first UATM service apparatus 701 requests the UATM network connector 712*a* for a unique identifier in the step S1101, and once the UATM network connector 712*a* issues a unique identifier, the unique identifier is assigned to the UATM service provider 711*a* of the first UATM service apparatus 701 in the step S1102.

In the step S1103, the UATM service provider 711*a* transmits to the UATM network 712*a* a control range join request message including, as a target identifier, a unique identifier of the UATM network connector 712*b* of the second UATM service apparatus 702 which defined the control range it wants to join in.

In the step S1104, the UATM network connector 712*a* searches for the UATM network connector 712*b* having the target identifier by communicating with other UATM services around it. In the step S1105, a control range join request message including the unique identifier of the UATM service provider 711*a* is transmitted to the UATM network connector 712*b* having the target identifier, based on the search result in the step S1104.

In the step S1106, the UATM network connector 712*b* forwards the control range join request message from the UATM service provider 711*a* to the UATM service provider 711*b* which defined the control range the UATM service provider 711*a* wants to join in. In the step 1107, upon receiving the control range join request message, the UATM service provider 711*b* determines whether or not to grant the join request based on a search result for information on the UATM service provider 711*a*.

Afterwards, in the step S1108, a control range join accept message is sent out, and in the step S1109, the UATM network connector 712*b* forwards the control range join accept message to the UATM network connector 712*a*.

Then, in the step S1110, the UATM network connector 712*a* forwards the control range join accept message to the UATM service provider 711*a*, whereby the procedure for the UATM service provider 711*a* joins in the predefined control range is completed.

Consequently, the UATM service provider 711*a* may participate in the predefined control range it has requested to join in in the step S1103.

FIG. 12 shows a process in which another UATM service apparatus joins and participates in a predefined control range when a plurality of UATM service apparatuses are already participating in that control range. A process in which a third UATM service apparatus 703 participates in a control range the first UATM service apparatus 701 and the second UATM service apparatus 702 are participating in will be described as an example.

The UATM network connector 712b of the second UATM service apparatus 702 may receive a control range join request message from the third UATM service apparatus 703 in the step S1201. Since the UATM network connector 712b of the second UATM service apparatus 702 is aware of information on UATM service apparatuses participating in the control range it belongs, it may find out in the step S1202 that there is a plurality of UATM service apparatuses participating in that control range.

Then, the UATM network connector 712b forwards the control range join request message to the UATM network connector 712a of the first UATM service apparatus 701 through data transmission in the step S1203, and transmits the control range join request message to the UATM service provider 711b connected to it in the step S1204.

In the step S1205, upon receiving the control range join request message, the UATM service provider 711b determines whether or not to grant the join request based on a search result for information on the third UATM service apparatus 703 which has made the control range join request in the step S1201. In the step S1206, the UATM service provider 711b may send out a control range join accept message.

After having received the control range join request message in the step S1203, the UATM network connector 712a forwards the control range join request message to the UATM service provider 711a connected to it in the step S1207. Upon receiving the control range join request message, the UATM service provider 711a determines whether or not to grant the join request based on a search result for information on the third UATM service apparatus 703 which has made the control range join request in the step S1201. In the step S1209, the UATM network connector 712a may send out a control range join accept message. This control range join accept message is forwarded to the UATM network connector 712b of the second UATM service apparatus 702 in the step S1210.

Then, if both the message in the step S1206 and the message in the step S1210 are a control range join accept message, the UATM network connector 712b authorizes the third UATM service apparatus 703 which has made the control range join request in the step S1201 to participate in the control range.

Meanwhile, the two service apparatuses participating in that control range may agree on granting the control range join request by negotiation during the join accept determination process in the step S1205 and the join accept determination process in the step S1208. If both of the UATM service apparatuses involved grant the join request during the negotiation procedure, the control range join accept messages in the step S1206 and the step S1209 may be sent out.

FIGS. 13 and 14 are conceptual diagrams illustrating examples of information included in an air traffic control policy that can be declared by an air traffic control processing method according to an embodiment of the present disclosure.

As mentioned previously, an air traffic control policy for a control range may include one or more of information on the control range and information on a data sharing system within the control range, for example, both of the two types of information.

As exemplified in FIG. 13, if the control range includes at least some of all air traffic control areas that are separated according to a physical space criterion, the air traffic control policy may include, as information on the control range, information 1310 on air traffic control areas included in the control range and information 1320 and 1330 on air traffic control areas respective UATM service apparatuses are in charge of to which the air traffic control policy is to be applied. Further, the air traffic control policy may additionally include information on an overlapping portion 1340 between the air traffic control areas corresponding to the different UATM service apparatuses.

As exemplified in FIG. 14, an air traffic control area included in a control range may include a plurality of unit spaces. For example, supposing that the air traffic control area is operated on a per-corridor basis, it may include a plurality of unit spaces (e.g., sixteen unit spaces), and information on the air traffic control area to which the air traffic control policy is to be applied may include information on at least some of the plurality of unit spaces, i.e., information on corresponding unit spaces, among the plurality of unit spaces. FIG. 14 shows an example in which two UATM service apparatuses divide a total of sixteen unit spaces and operate them in two control ranges 1410 and 1420. In this case, as exemplified in FIG. 14, in the two control ranges 1410 and 1420, the two unit spaces 6 and 10 may be mapped to each other. The number of unit spaces mapped to one another is not specifically limited.

Moreover, as exemplified in FIG. 5, for a control range that is defined based on air traffic control objects that are separated according to a logical operation criterion, the control objects may be expanded after the control range is defined, and therefore a UATM service apparatus may be required which is in charge of the control range with respect to an undefined control object. To this end, information on a newly defined object, among all air traffic control objects, may be added as information on a control range included in an air traffic control policy.

In addition, information on a data sharing system between UATM service apparatuses within a control range may include information on a system for sharing data by mirroring and a minimum storage space for storing data. In this case, UATM service apparatuses within the same control range may store the same data in the minimum storage space by mirroring.

Also, the information on a data sharing system within the control range may include information on a system for relay transmission and sharing of omitted data. In this case, the omitted data may be relayed and synchronized between the UATM service apparatuses. For example, certain data may be necessarily stored in at least one UATM service apparatus within the control range, and having succeeded in storing that data, the UATM service apparatus may propagate the data within the control range through another UATM service apparatus.

FIGS. 15 to 17 are conceptual diagrams illustrating various examples of a control range that can be configured by an air traffic control processing method according to an embodiment of the present disclosure.

As exemplified in FIG. 15, if a UATM service apparatus 1502 initially defines a control range 1501 or manages solely through exclusive relationship-based operation, a service provider 1503 within the control range 1501 may request the UATM service apparatus 1502 to send control data. However, a service provider 1504 which is not included in the control range 1501 may request the UATM service apparatus 1505 connected to it to send control data from the UATM service apparatus 1502.

As exemplified in FIG. 16, if a plurality of UATM service apparatuses 1602 and 1603 manage a control range 1601 in cooperation with one another, a system for sharing the same data by mirroring may be used as a data sharing system within the control range. In this case, a service provider 1604 within the control range 1601 may request all of the plurality of UATM service apparatuses 1602 and 1603 to send control data. A service provider outside the control range 1601 may make a request to send control data for the control range 1601 through one of the plurality of UATM service apparatuses 1602 and 1603.

As exemplified in FIG. 17, when a plurality of UATM service apparatuses 1703, 1704, and 1706 define a plurality of control ranges 1701 and 1702, they may use a relay transmission and sharing system as a system for sharing data between the UATM service apparatuses. The control range 1701 and the control range 1702 may include an overlapping portion, and the UATM service apparatus 1704 may be located in this overlapping portion. In this case, the UATM service apparatus 1704 has authorization to access all control data for the control range 1702 but no authorization to access some control data for the control range 1701. A service provider 1705 may request the UATM service apparatuses 1703 and 1704 to provide control data to it, and a service provider 1707 may request the UATM service apparatuses 1704 and 1706 to provide control data to it. When the service provider 1707 requests the UATM service apparatus 1706 to send control data, the UATM service apparatus 1706 included in the same control range 1702 as the UATM service apparatus 1704 may provide the service provider 1707 with information indicating that it may act as a proxy for data transmission or directly request the UATM service apparatus 1704 to send control data.

FIG. 18 is a configuration diagram of a multiplex control system when a DSS data exchange protocol is applied between UATM service providers.

Referring to FIG. 18, a plurality of UATM service providers is individually connected to a DSS, and a supplemental data service provider (SDSP or other SP) provides various kinds of information such as flight information or the like to a prearranged specific UATM service provider.

Such a multiplex control system using a DSS data exchange protocol provides a distributed environment with multiple instances, and allows selective sharing of information depending on the UATM service provider's decision.

Meanwhile, a computer program may be implemented to include instructions for allowing the processor to perform the steps included in an UATM control processing method according to the foregoing embodiment.

Moreover, the computer program including instructions for allowing the processor to perform the steps included in an UATM control processing method according to the foregoing embodiment may be written on a computer-readable recording medium.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An urban air traffic management (UATM) service apparatus included in a plurality of UATM service apparatuses for implementing a multiplex UATM network, the UATM service apparatus comprising:

a UATM network connector configured to share control data with other UATM network connectors connected to the multiplex UATM network based on a pre-determined authority; and a UATM service provider configured to perform control processing on at least one of a plurality of control objects or control areas separated from all control objects or control areas for the multiplex UATM network according to a pre-determined logical operation criterion or a pre-determined physical space criterion, and collect the control data by a pre-determined criterion or modify the control data by a pre-determined criterion to share the collected control data or the modified control data with other UATM service apparatuses through the UATM network connector and the other UATM network connectors.

2. The UATM service apparatus of claim 1, wherein the UATM service provider is configured to perform reliability-based information exchange with a supplemental data service provider (SDSP) within a control range which is defined according to the pre-determined physical space criterion or the pre-determined logical operation criterion, and perform information exchange with a supplemental data service provider within a different control range based on authority given by other UATM service provider within the different control range.

3. The UATM service apparatus of claim 1, wherein the UATM network connector is configured to manages authentication or authorization for participation in the multiplex UATM network on behalf of the UATM service apparatus.

4. The UATM service apparatus of claim 1, wherein the UATM service provider is configured to grant the UATM network connector the authority to manage authentication or authorization for participation in the multiplex UATM network.

5. The UATM service apparatus of claim 1, wherein the UATM service provider or the UATM network connector is configured to assign a unique UATM service identifier to the UATM service apparatus thereof to exchange data with the other UATM network connectors.

6. The UATM service apparatus of claim 1, wherein the UATM network connector is connected to the other UATM service apparatuses included in the multiplex UATM network, and wherein the UATM service provider is configured to transmit and receive the control data by mirroring the other UATM service apparatuses through the UATM network connector or relays the control data to other UATM service apparatuses to synchronize the control data.

7. The UATM service apparatus of claim 6, wherein the UATM network connector is connected to transmit to the other UATM service apparatuses information on a UATM service provider storing control data to be synchronized in order to relay the control data.

8. The UATM service apparatus of claim 6, wherein different data exchange rules are applied depending on whether a control object or a control area controlled by the UATM service apparatus and a control object or a control area controlled by the other UATM service apparatus are the same or different.

9. The UATM service apparatus of claim 6, wherein, if a control object or a control area controlled by the UATM service apparatus and a control object or a control area controlled by the other UATM service apparatus are the same, the UATM service provider included in the control object or the control area directly requests other UATM service provider included in the control object or the control area.

10. The UATM service apparatus of claim 6, wherein, if a control object or a control area controlled by the UATM service apparatus and a control object or a control area controlled by the other UATM service apparatus overlap at least partially, the UATM service provider of the other UATM service apparatus acts as a proxy for data transmission upon a request for information on the UATM service provider of the UATM service apparatus, or provides information indicating that it is able to receive data from the UATM service provider of the UATM service apparatus.

11. An urban air traffic management (UATM) control processing method performed by a UATM service apparatus included in a plurality of UATM service apparatuses for implementing a multiplex UATM network, the method comprising:

receiving, by a UATM service provider performing control processing, a unique identifier assigned by a UATM network connector connected to the multiple UATM network according to a data exchange system based on a preset protocol;

setting, by the UATM service provider, a control object or control area thereof according to a pre-determined logical operation criterion or a pre-determined physical space criterion, among all control objects or control areas for the multiple UATM network; and declaring, by the UATM service provider, the set control object or the set control area thereof using the unique identifier through the UATM network connector.

12. The UATM control processing method of claim 11, wherein the declaring allows other UATM service apparatuses to check for an air traffic control policy to be applied to the control object or the control area.

13. The UATM control processing method of claim 11, further comprising:

receiving a join request from other UATM service provider or other UATM network connector wanting to control a desired control object or a desired control area in a pre-determined control object or control area;

determining whether or not to grant the request to join in the desired control object or the desired control area; and notifying information on whether or not the request is granted the other UATM service provider or the other UATM network connector.

14. The UATM control processing method of claim 13, wherein, in the receiving of the join request, if two or more of the plurality of UATM service apparatuses are participating in the desired control object or the desired control area, it is determined whether or not the request is granted by negotiation between the two or more UATM service apparatuses.

15. The UATM control processing method of claim 12, wherein the air traffic control policy includes information on the control object or the control area and a data management scheme between UATM service apparatuses within a control range.

16. The UATM control processing method of claim 11, further comprising:

performing, by the UATM service provider, control processing on at least one of a plurality of control objects or control areas separated from all control objects or control areas for the multiplex UATM network according to the pre-determined logical operation criterion or the pre-determined physical space criterion; and transmitting and receiving, by the UATM service provider, the control data collected by a pre-determined criterion or modified by a pre-determined criterion by mirroring other UATM service apparatuses through the UATM network connector connected to the multiple UATM network, or relaying the control data to the other UATM service apparatuses to synchronize the control data.

17. The UATM control processing method of claim 16, wherein, if a control object or a control area controlled by the UATM service apparatus and a control object or a control area controlled by the other UATM service apparatus are the same, the UATM service provider included in the control object or the control area directly requests the other UATM service provider included in the control object or the control area.

18. The UATM control processing method of claim 16, wherein, if a control object or a control area controlled by the UATM service apparatus and a control object or a control area controlled by the other UATM service apparatus overlap at least partially, the UATM service provider of the other UATM service apparatus acts as a proxy for data transmission upon a request for information on the UATM service provider of the UATM service apparatus, or provides information indicating that it is able to receive data from the UATM service provider of the UATM service apparatus.

19. A non-transitory computer readable storage medium storing computer executable instructions, wherein the instructions, when executed by a processor, cause the processor to perform an urban air traffic management (UATM) control processing method performed by a UATM service apparatus included in a plurality of UATM service apparatuses for implementing a multiplex UATM network, the method comprising:

receiving, by a UATM service provider performing control processing, a unique identifier assigned by a UATM network connector connected to the multiple UATM network according to a data exchange system based on a preset protocol;

setting, by the UATM service provider, a control object or control area thereof according to a pre-determined logical operation criterion or a pre-determined physical space criterion, among all control objects or control areas for the multiple UATM network; and declaring, by the UATM service provider, the set control object or the set control area thereof using the unique identifier through the UATM network connector.

20. The non-transitory computer readable storage medium of claim 19, wherein the UATM control processing method further comprises:

performing, by the UATM service provider, control processing on at least one of a plurality of control objects or control areas separated from all control objects or control areas for the multiplex UATM network according to the pre-determined logical operation criterion or the pre-determined physical space criterion; and transmitting and receiving, by the UATM service provider, the control data collected by a pre-determined criterion or modified by a pre-determined criterion by mirroring other UATM service apparatuses through the UATM network connector connected to the multiple UATM network, or relaying the control data to the other UATM service apparatuses to synchronize the control data.

* * * * *